(12) United States Patent
Byrnes et al.

(10) Patent No.: US 8,788,701 B1
(45) Date of Patent: Jul. 22, 2014

(54) SYSTEMS AND METHODS FOR REAL-TIME DETERMINATION OF THE SEMANTICS OF A DATA STREAM

(75) Inventors: John Byrnes, Poway, CA (US); Richard Rohwer, San Diego, CA (US)

(73) Assignee: Fair Isaac Corporation, Minneapolis, MN (US)

( * ) Notice: Subject to any disclaimer, the term of this patent is extended or adjusted under 35 U.S.C. 154(b) by 1090 days.

(21) Appl. No.: 11/509,930

(22) Filed: Aug. 25, 2006

(51) Int. Cl.
*G06F 15/173* (2006.01)
(52) U.S. Cl.
USPC ............................ 709/238; 709/231; 707/101
(58) Field of Classification Search
USPC .................. 709/205, 206, 231, 238; 707/101
See application file for complete search history.

(56) References Cited

U.S. PATENT DOCUMENTS

| | | | |
|---|---|---|---|
| 6,263,337 B1 * | 7/2001 | Fayyad et al. ........................ | 1/1 |
| 6,820,237 B1 * | 11/2004 | Abu-Hakima et al. ....... | 715/210 |
| 2002/0055946 A1 * | 5/2002 | Prager et al. .................. | 707/500 |
| 2003/0023593 A1 * | 1/2003 | Schmidt ............................ | 707/6 |
| 2003/0074369 A1 * | 4/2003 | Schuetze et al. .......... | 707/103 R |
| 2004/0054670 A1 * | 3/2004 | Noff et al. .......................... | 707/3 |
| 2004/0215718 A1 * | 10/2004 | Kazmi et al. .................. | 709/203 |

OTHER PUBLICATIONS

Byrnes, J. et al., "Text Modeling for Real-Time document Categorization", IEEEAC paper #1375, Version 4, Updated Nov. 30, 2004—11 pages.

Freitag, D., "Trained Named Entity Recognition Using Distributional Clusters", HNC Software, LLC, San Diego, CA 92130, No Date,—8 pages.
Freitag, D., "Toward Unsupervised Whole-Corpus Tagging", HNC Software, LLC, San Diego, CA 92130, No Date—7 pages.
Freitag, D., "Morphology Induction From Term Clusters", HNC Software, LLC, San Diego, CA 92130, No Date—8 pages.
MacKay, D., "Information Theory Inference, and Learning Algorithms", Cambridge University Press Aug. 25, 2004, 640 pages.
Neal, R., "Probabilistic Inference Using Markov Chain Monte Carlo Methods", Technical Report CRG-TR-93-1, Dept. of Computer Science, University of Toronto, Sep. 25, 1993, 144 pages.
Paninski, L., "Estimation of Entropy and Mutual Information", Neural Computation 15, pp. 1191-1253 (2003).
Salton, G., "The Smart Retrieval Systems, Experiments in Automatic Document Processing", Prentice-Hall, Inc. 1971, Section 14, "Relevance Feedback in Information Retrieval" by J.J. Rocchio, Jr., issued originally as Section XXIII of Scientific Report ISR-9, Aug. 1965. 2 cover pages and then pp. 313-323.
Wolpert, D. et al., "Estimating Functions of Probability Distributions From a Finite Set of Samples—Part I: Bayes Estimators and the Shannon Entropy". pp. 1-21.

(Continued)

*Primary Examiner* — David Lazaro
*Assistant Examiner* — Marie Georges Henry
(74) *Attorney, Agent, or Firm* — Fulbright & Jaworski LLP (57) ABSTRACT

The present invention is directed to a method and method which analyzes large amounts of information on a real-time basis with no previous static data set. Attributes of the data, which can be thought of as data concepts, that are present in the data stream are detected and isolated. These concepts are referred to as clusters and are used to ultimately determine the semantics of the data stream. The streaming clusters have no "current membership" in the existing state of the clustering and thus the cluster sets, and their relationship to each other, must be generated and updated as the data is being received.

23 Claims, 7 Drawing Sheets

(56) References Cited

OTHER PUBLICATIONS

Wolf, D. et al., "Estimating Functions of Probability Distributions From a Finite Set of Samples—Part II: Bayes Estimators for Mutual Information, Chi-Squared, Covariance, and other Statistics", pp. 1-50.

"Advanced Research in Text Processing and Visualization" Final Report, Dec. 15, 1998, HNC Software Inc., San Diego, CA, pp. 1-64.

* cited by examiner

SYSTEMS AND METHODS FOR REAL-TIME DETERMINATION OF THE SEMANTICS OF A DATA STREAM

STATEMENT REGARDING FEDERALLY SPONSORED RESEARCH OR DEVELOPMENT

The U.S. Government has a paid-up license in this invention and the right in limited circumstances to require the patent owner to license others on reasonable terms as provided for by the terms of contract number MDA 972-03-9-001 awarded by the Air Force Research Laboratory, Air Force Material Command, USAF.

TECHNICAL FIELD

This invention relates to streaming data and more particularly to systems and methods for real-time determination of the semantics of a data stream.

BACKGROUND OF THE INVENTION

There are many situations where it is desirable to organize data into clusters without first knowing anything about the data that is being organized. For example, e-mails arrive at an e-mail address (or set of addresses) on a constant basis. These e-mails come from different senders and are not necessarily related to each other. It would be desirable to organize this incoming e-mail stream into, for example, categories for storage and ultimate retrieval in an organized fashion.

Similarly, data pertaining to financial transactions can stream into a business from a plurality of sources or text data can be streamed into a location and it is desired to be able to separate the data into categories or partitions for subsequent viewing or use. Sometimes this data arrives in a streaming fashion (such as network traffic) and sometimes it is contained in large batch files, such as archived data files. In either event, it is desired to be able to determine the semantics of this data without first knowing what the data contains and without requiring a static data set.

Previously, for example in a paper titled, "Text Modeling for Real-Time Document Categorization," published in March 2005 in the transactions of the IEEE, which paper is hereby incorporated by reference herein, the idea of performing real-time document categorization is broached but the actual implementation is left undecided as a future research item. In the above-referenced paper, while hardware is described which assigns documents to categories in real-time the paper requires a previous "learning" of the data structures.

BRIEF SUMMARY OF THE INVENTION

The present invention is directed to a system and method which analyzes large amounts of information on a real-time basis with no previous static data set. Attributes of the data, which can be thought of as data concepts, that are present in the data stream are detected and isolated. These concepts are referred to as clusters and are used to ultimately determine the semantics of the data stream. The streaming documents have no "current membership" in the existing state of the clustering and thus the cluster sets, and their relationship to each other, must be generated and updated as the data is being received.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which.

DETAILED DESCRIPTION OF THE INVENTION

Figure 1:
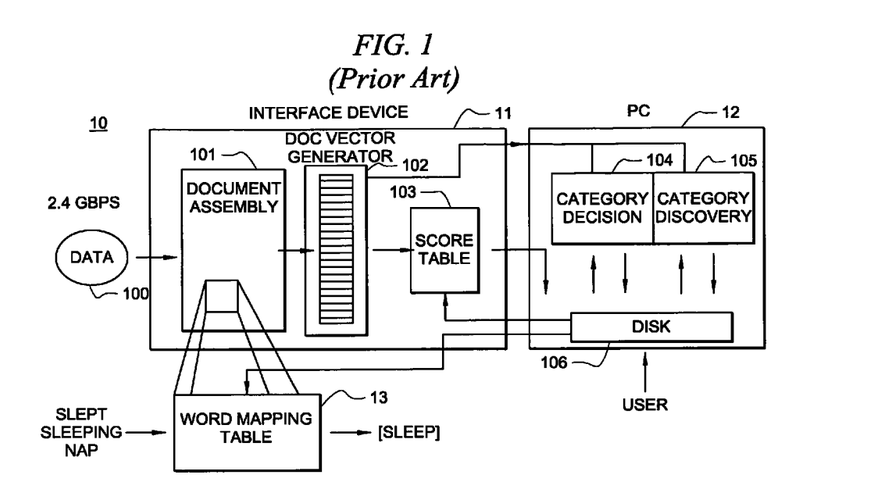
FIG. 1 shows one embodiment of a prior art hardware configuration for practicing the inventive concepts taught herein.

FIG. 1 shows prior art embodiment 10 of a configuration for practicing semantic characterizations in non-real-time, i.e., off-line. The main components are interface device 11, PC 12 and word mapping table (WMT) 13. WMT 13 and score table 103 are data tables which can be within or outside of interface device 11. Device 11 can be a processor, reconfigurable hardware such as field programmable gate arrays, or may be hardwired using ASICs. As shown in FIG. 1, these tables are populated off-line from data calculated independent of the incoming data stream. One of the problems with the off-line population (when a real-time system is used) is that memory is unlimited since speed of operation is not an issue. However, as line speed increases, memory access time becomes significant and thus a real-time system can not rely on large memory databases of words or pre-identified clusters. As will be discussed hereinafter, with respect to the configurations shown in FIGS. 4 and 6, these tables will be populated on a real-time basis with the clusters that are pertinent to the incoming data in keeping with the inventive concepts.

The real-time nature of the algorithms to be discussed allows for the learning of an appropriate term partition for the data stream as the data arrives. This approach allows for language independence as well as allowing for the correct treatment of novel vocabulary and non-standard usage, such as slang and/or code. If all of these contingencies are provided for in an "off-line" system, a large database (and slow operation) result.

The desired term partition is the one that allows for the best document partition to be discovered. This is accomplished by simultaneously searching for an optimal document partition and a term partition. This simultaneous operation is called co-clustering.

In a data streaming environment one challenge is data acquisition and storage since the distribution of a term over several documents cannot be estimated until a large number of documents have been seen. However, memory and timing restrictions in the streaming hardware prohibit accumulating all of the term-document co-occurrence data even for moderately sized document sets.

A second restriction is on the organization of the data. When referring to "rows" and "columns" of a data matrix, we are of course referring to a single linear arrangement of memory in which rows are contiguous segments and columns are constant offsets from beginnings of rows. Because contiguous segments of memory can be read and written quickly, operations on rows are efficient. Because random access into memory takes much longer, frequent operations directly on "columns" can be prohibitively slow. Because co-clustering is based on the simultaneous clustering of rows and columns, occasional large transpose operations will be introduced on the matrix so that the columns of the original matrix become the rows of the transposed matrix, allowing for efficient operation. Because this transpose operation itself takes a large amount of time, it must not be performed with high frequency.

Figure 7:
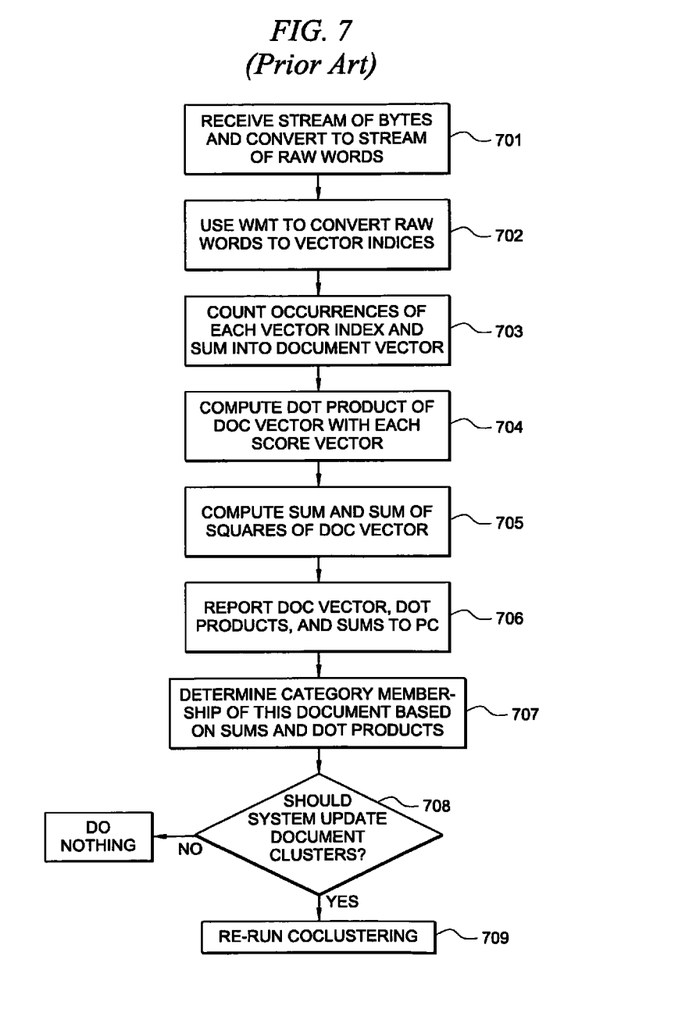
FIG. 7 shows a flow chart for use in prior art systems.

Referring again to FIG. 1, in one embodiment, streaming data 100 is assembled by document assembly 101, perhaps from an incoming TCP flow. Using word mapping table 13, the assembly converts the incoming documents to a vector representation 102 and computes the vector's score in each category by score table 103. This operation is shown in FIG. 7 by processes 701 through 705 of flow chart 70. Disk 106 can be any type of memory device with speed of operation being important (especially in the on-line configuration). Disk 106 contains all scores from all documents, stored document vectors and, if desired, information about raw words.

A document, in one embodiment, is represented as a 4000 dimensional vector of derived features. The raw terms of the documents are hashed to produce 20-bit values (i.e., they range from 0 to approximately 1 million). The derived document features are clusters of these hash values. Thus, if the first term cluster is the set of hash values of the terms "dog", "cat", "mouse", and "pet", then a document containing three occurrences of the word "dog", one occurrence of the word "pet", and no occurrences of "mouse" or "cat" will have a value of four for the first dimension of its feature vector. The document vector is represented by 4-bit values, so no feature is counted higher than 15. The cluster membership relation is defined by WMT 13. The hardware implementation of the WMT could be, for example, a simple look-up table with 1 million entries (the values of the hash function), each mapped to a derived feature index (0 to 3,999).

Once the data flow is converted to a document vector, the system computes the inner product of the document vector with each of a set of up to 15 vectors, referred to as score table (ST) 103. The score table also computes the sum of the entries in the document vector and the sum of the squares of these entries.

The inner products and sums are, in the embodiment being discussed, reported to a computer, such as PC 12 (process 706) where auxiliary data can be used to categorize each document (process 707) based on its set of scores. The score table circuitry can be any circuitry or method that can rewrite the score vectors such that all dot product computation are carried out in parallel, allowing for rapid throughput. One such score table is derived to represent concept centroids, in the style of the Rocchio algorithm outlined at Chapter 14, pp 313-323 of The SMART Retrieval System: Experiments in Automatic Document Processing, Prentice-Hall Inc. 1971, which is hereby incorporated by reference herein. The same architecture, however, also permits for the implementation of linear support vector machine models and naïve Bayesian models.

Figure 2:
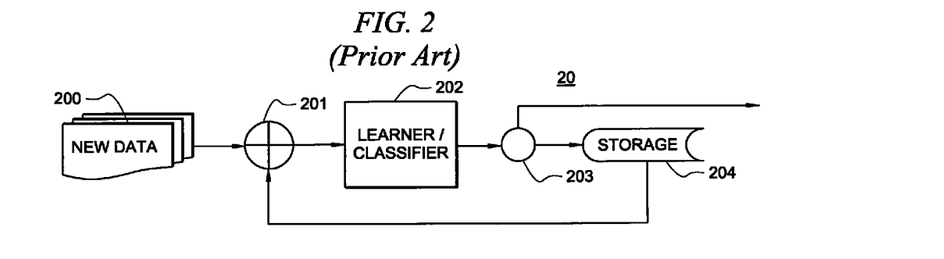
FIG. 2 shows one embodiment of a prior art system that includes both on-line learning and storage of additional data.

FIG. 2 shows one embodiment 20 of a system that includes storage of massive amounts of data so that old data can be re-analyzed from time to time. In embodiment 20, incoming data 200 is mixed via mixer 201 with past data from storage 204 so that the system continually learns from and reevaluates past data while simultaneously learning from and evaluating new data, via device 202. Note that storage of data could depend on the output of the classification system and classification results can be stored with the raw data, if desired. This classification data can become, if desired, metadata.

The clusters that will used for the word mapping table need to minimize the information lost by the identification of keywords that could be used for classification. This is accomplished by putting similar terms together. Terms are considered similar if they occur in similar documents. Documents are considered similar when they contain similar terms. While this definition may appear to be circular, it can actually be regarded more as two equations in two unknowns to be solved simultaneously. Thus, the task becomes one of simultaneously finding two partitions: one with respect to terms and one with respect to documents. The system selects the pair of partitions (process 709, FIG. 7) which maximizes the ability to predict document categories from term clusters and to predict term clusters from document categories, i.e., the mutual information between the partitions is maximized. This process is called co-clustering and a detailed explanation is given in J. Byrnes and R. Rohwer. "Text Modeling for Real-Time Document Categorization", in 2005 IEEE Aerospace Conference Proceedings, Big Sky, Mont., IEEE Pub. 05TH8788C, ISBN 0-7803-8870-4, IEEE, 2005; International Conference on Computational Linguistics (Coling '04), Geneva, 2004; D. Freitag, "Trained Named Entity Recognition Using Distributional Clusters", in The 2004 Conference on Empirical Methods in Natural Language Processing (EMNLP '04), Barcelona, 2004; D. Freitag, "Toward Unsupervised Whole-Corpus Tagging", in The 20th International Conference on Computational Linguistics (Coling '04), Geneva, 2004; and D. Freitag, "Unsupervised Learning of Morphology from Term Clusters", in 43rd Annual Meeting of the Association for Computational Linguistics (ACL 2005), Ann Arbor, 2005; all of which articles are hereby incorporated by reference herein.

The mutual information between n terms and k documents is given by $$M = \sum_{i=1}^{k}\sum_{j=1}^{n} p_{ij}\log\frac{p_{ij}}{p_{i\bullet}p_{\bullet j}} = \sum_{i=1}^{k}\sum_{j=1}^{n} p_{ij}\log p_{ij} - \sum_{i=1}^{k} p_{i\bullet}\log p_{i\bullet} - \sum_{j=1}^{n} p_{\bullet j}\log p_{\bullet j}$$

where $p_{ij}$ is the probability of finding term j in document i when choosing an arbitrary term occurrence in an arbitrary document, and $$p_{i\bullet} \sum_j p_{ij} \text{ and } p_{\bullet j} = \sum_i p_{ij}.$$

The optimal use of number count data for estimating mutual information is a complex area of active research M. Hutter and M. Zaffalon "Bayesian treatment of incomplete discrete data applied to mutual information and feature selection," in R. Kruse, A. Gunter and B. Neumann, Eds., Proceedings of the 26th German Conference on Artificial Intelligence (IK-2003), Lecture Notes on Computer Science 2821, pp 396-406, Heidelberg, Springer, 2003; L. Paninski "Estimation of entropy and mutual information", Neural Computation 15, pp. 1191-1254, 2003; and D. H. Wolpert and D. R. Wolf "Estimating functions of probability distributions from a finite set of samples," Physical Review E, 52, pp. 6841-6854, 1995; all of which are hereby incorporated by reference herein, but in the constraints of our implementation it is feasible only to follow the simple expedient of assigning $p_{ij}$ by normalizing the number counts $N_{ij}$ in the Word Mapping Table: $p_{ij}=N_{ij}/N$ with $$N = \sum_{ij} N_{ij}.$$

This gives the form:

$$M = \sum_{i=1}^{k} \sum_{j=1}^{n} N_{ij} - \sum_{i=1}^{k} N_{i\bullet} \log N_{i\bullet} - \sum_{j=1}^{n} N_{\bullet j} \log N_{\bullet j} + N \log N$$

in which each term can be interpreted as a dot product, and the logarithms can be pre-computed on all integers within the dynamic range of the counters.

In software on a standard general computing platform, the problem can be construed as follows. Given a set of documents on a fixed vocabulary, each document is converted to its representative vector and a matrix is constructed whose rows are these document vectors, as shown in FIGS. 3A and 3B.

Figure 3A:
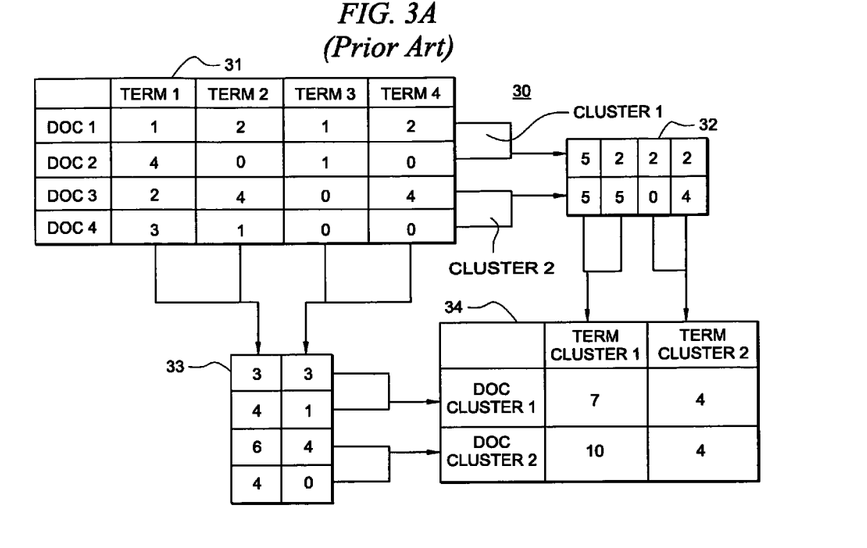
FIGS. 3A and 3B show prior art embodiment of a co-clustered, co-occurrence matrix and its development.
Figure 3B:
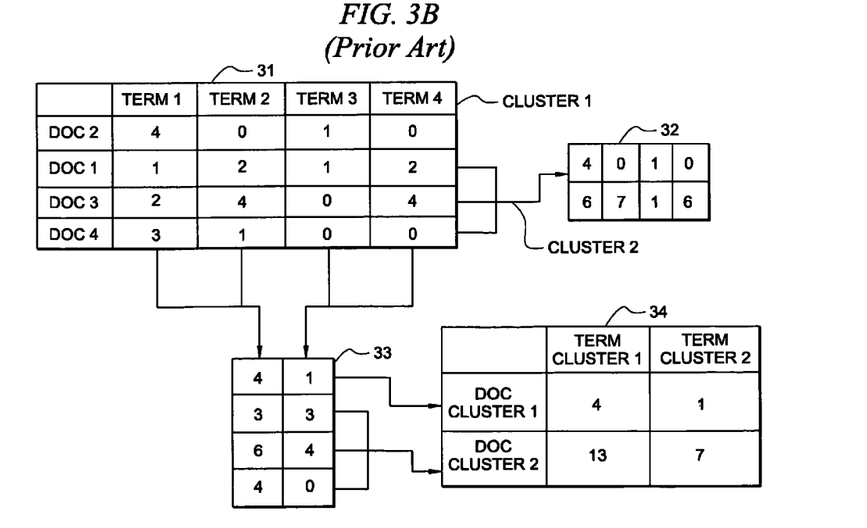

FIG. 3A shows one embodiment of co-clustered, co-occurrence matrix 30. Illustrated are four documents and a vocabulary of four terms. In practice there would be hundreds of thousands of terms and possibly millions of documents. Simulated annealing is applied to search for the optimal partition. This is done by first assigning each row arbitrarily to a row cluster and each column arbitrarily to a column cluster and choosing a starting temperature T. Higher initial values of T take longer to converge; lower values of T restrict the search to maxima which are more local to the starting point. The latter may be desirable if the starting point is chosen based on background knowledge about the vocabulary or document set. However, doing this could unavoidably expose the process to possible erroneous bias.

FIG. 3A illustrates a four document, four term example 31 where documents 1 and 2 are assigned to cluster 1 and documents 3 and 4 are assigned to cluster 2. Matrix 32 is then obtained by summing rows as shown. Matrix 33 is obtained by summing the columns. Then carrying out both document and term assignments yields cluster/cluster matrix 34.

The system then randomly selects either a row r or a column c. Assuming a row is selected, (the procedure for columns is analogous), then let R be the row cluster containing r and randomly choose any other row cluster R'. r is moved from R to R', and the change in the value of the objective function is observed when the move is made. If, for example, document 1 is moved into cluster 2, as shown in FIG. 3B, then the initial matrix is shown by matrix 31' and the row and column matrices are shown by 32' and 33', respectively and thus the first row of cluster/cluster matrix 34' becomes (4, 1) and the second row becomes (13, 7).

Let $f$ be the value of the objective function when r∈R and $f'$ be its value when r∈R' instead. If $f'>f$ then we move r to R'. Otherwise we move r to R' with probability $p=\exp[(f'-f)/T]$. Since f≥f' whenever we move probabilistically, p is necessarily no greater than 1; as T approaches 0, the exponent grows large in magnitude but is negative, sop approaches 0. In the example in FIGS. 3A and 3B, the original mutual information is 0.0049 bits. After moving document 1 to cluster 2, the mutual information of the resulting matrix is 0.013 bits, so the system would deterministically accept this move. The parameter T is gradually decreased over time, so that the algorithm is initially very random and becomes more deterministic as the computation moves forward and the data is placed in the proper cluster, process 709.

This simulated annealing procedure is known to produce samples from the Boltzman distribution for energy $-f$, the distribution proportional to $e^{f/T}$, if run sufficiently long at any particular temperature T, and to concentrate on the maximum of the objective $f$ if T is lowered sufficiently slowly D. J. C. Mackay Information Theory, Inference, and Learning Algorithms, Cambridge, 2003; and R. M. Neal "Probabilistic inference using Markov chain Monte Carlo Methods", Technical Report CRG-TR-93-1, Dept. of Computer Science, U. Toronto, which publications are hereby incorporated by reference herein, therefore it can be used as a global maximization algorithm for an arbitrary objective, without regard to regularity conditions such as smoothness. In practice, it is almost never practical to lower T as slowly as required to guarantee maximization, but faster schedules are typically found to produce satisfactory local maxima. The random process for moving documents from one cluster to another must also satisfy certain technical conditions to guarantee that samples will be derived from the Boltzman distribution. A sufficient condition is detailed balance, which holds that the probability of selecting any particular configuration (assignment of documents to clusters) X from the Boltzman distribution and changing X to configuration X' through the move selection process must be the same as the probability of selecting X' and changing it to X. The constraints of on-line data processing causes us to violate this condition somewhat, but our experimental results show that the resulting distribution, while not necessarily Boltzman, is still concentrated on the maximum off and concentrates more sharply as T is lowered.

For the real-time, the overall objective function is the mutual information of the joint distribution over the cluster/cluster space. Evaluating the change in mutual information when a single row is moved requires component-wise multiplications just as in the computation of the dot product. We assume that minor modifications to the score table circuitry will enable fast parallel computation of the objective function. Real-time data (documents) can be any type of packetized data (such as Ethernet or IP) or could, for example, be transactions. Also, it will be appreciated by those skilled in the art that "terms" refer to byte sequences and that any rule for tokenizing byte sequences can be used to create "terms", which do not need to have linguistic interpretation. For example, these might be fields in databases, items in transaction data, fixed-length sequences, or elements of some pre-defined custom language.

As discussed above, both the real-time character of the data and the restrictive nature of hardware present constraints on implementation that force the algorithm to change from an algorithm that would be acceptable if non-real time determination of the WMT were to be used. The revised algorithm is not expected to find an absolute maximum to the objective function in a finite time, and is not expected to preserve the exact output of the algorithm when minor changes are made. Rather, the revised algorithm will fit the operating constraints needed to evaluate whether the values of the objective function of the final output state are approximately the same as the values obtained by the original algorithm running on a software platform with pre-defined values.

The computation of change in objective function is comparable to the dot product computation carried out in the score table circuit. The circuitry shown in FIG. 1 carries out a dot product between a single vector on the one side and several vectors on the other. In order to maximize the parallelism (and presumably the speed-up) of the revised algorithm, the system must simultaneously consider the objective function changes for multiple moves at a single time. A probability distribution is evaluated over all moves from which to pick the one move (if any) that is necessary to make. The distribution used in software requires a move to the better state if the system is already in the better state, and the system moves to a worse state with a probability based on the difference in the objective function otherwise. One way to generalize this to the case where multiple moves are considered in order to deterministically move to the best available state, if the system is not in it already, and otherwise to move to the second best state with the same probability described previously. This technique has the effect of speeding up the search by orders of magnitude.

Clustering was discussed above in the context of finding partitions over the raw data. In the online scenario, the preference is not to bound the number of documents which might be considered during the learning phase. Because memory availability is limited and because memory access can be slow, the preferred method is not to store either the document membership relation or any individual document data. The "recirculation" scheme diagrammed in FIG. 2 allows for the same documents to be iterated over a number of times, but it also allows for new documents to continually go through the cycle. By accumulating the counts in the score table, the system can ignore the identities of the documents and not distinguish new from old documents. This architecture, however, no longer allows the subtraction of a row from its "current cluster", because the system does not store cluster membership. For this reason the system will need to periodically downscale the stored cluster/cluster matrix (processes 824 and 825, FIG. 8E). The rate of downscaling will greatly effect the ability to track source movement over time, but for simplicity we assume a stationary source. In this circumstance, it is best to downscale as infrequently as the hardware constraints allow in order to maximize the effective amount of data in use and thereby minimize statistical estimation error. In this context, downscaling is defined as multiplying the entire cluster/cluster matrix by a small constant fraction so that future additions do not cause memory overflows.

The same observation prevents the system from applying the desired probability distribution. If the system always moves to the best cluster, then it has lost the stochastic component of the algorithm and the resulting output is considerably degraded. The assumption then is that in each case the data point being considered is already in the best cluster, and the system moves to the second best with the probability as above.

Because cluster membership information is discarded, the system state can no longer be regarded as a collection of cluster assignments, nor can the system change state by moving a document from one cluster to another. The state is simply the collection of term/cluster number counts, which can be altered only by adding a document to a given cluster (and then forgetting about the document) or downscaling all the number counts. Because there is no concept of a document's "current cluster" the system does not try to determine whether another cluster is "better". The system does, however, determine the effect on the objective function of adding the document to any particular cluster, and determines the two best clusters by this criterion. The document is assigned to the second best cluster with probability $p_2 = e^{(f_2 - f_1)/T}$ and to the best with probability $1 - p_2$, where $f_1$ and $f_2$ are the mutual information that would result from insertion into the best or second best clusters respectively. This gives a plausible adaptation of a most empirically successful move process to this constrained situation.

The system has access to a data row each time a new document comes in, but does not have access to any full columns (and hence cannot make column reassignments) until a large number of documents have arrived. Thus, column statistics are accumulated (in ST2, 52 in FIGS. 5 and 6, as described in FIG. 8C) as documents arrive and the column operations are delayed. Since document identities are not stored the system must store co-occurrence of terms with document clusters rather than with individual documents.

The goal of the design of the embodiment discussed herein is to take advantage of the software solution and thus to limit the amount of new circuitry required to carry out online co-clustering. The process of assembling the raw documents and converting them to the documents with the term-cluster features (i.e., creating the rows in matrix 33, FIG. 3A) is exactly what is provided by the existing front-end circuitry and word mapping table (WMT) except that it is performed in real-time using, for example, the process discussed herein.

We already noted above that the algorithm computing the change in mutual information created when a new row is added to a given row cluster should not be difficult to implement as a variation of the existing score table circuitry. An additional change that is required is that the new counts be added into the existing table each time a document is added to a cluster. This functionality is part of the score table (ST).

Because the ST operates on rows only, a transpose will need to be performed in order to carry out the column operations. Thus, circuitry capable of transposing a score table is necessary Also required is a block which takes the distances (changes in MI) computed by the ST and uses these to pseudo randomly choose the ST row to which the current document should be added. In the embodiment discussed herein, this is the only new component that will be needed, with the exception of control circuitry to run the algorithm and possibly minor modification of the existing blocks which write the WMT so that they are able to write it from RAM.

Figure 4:
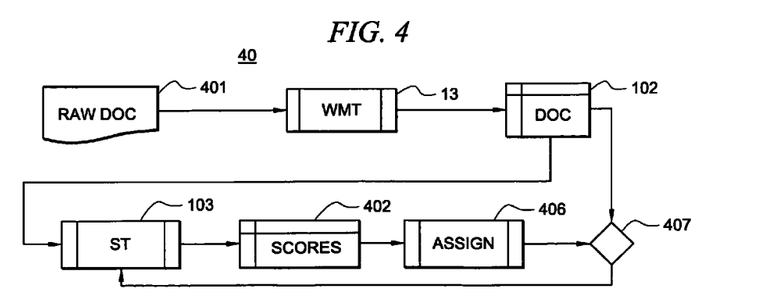
FIG. 4 illustrates one embodiment for on-line document clustering.

FIG. 4 illustrates one embodiment 40 for online document clustering and diagrams the data flow for updating ST 103 each time a document, such as document 401, arrives. The raw document is first processed by WMT 13 (the TCP and counting processing are not shown in the diagram) producing document vector 102 (as discussed with respect to FIG. 1). ST 103 computes and stores scores for each of the clusters and stores the scores in storage 402. Assignment block 406 determines which cluster the document should be placed into (based on the probability distribution described above). Diamond 407 indicates that both the assignment information and the document vector are used to update ST 103. Note that ST plays the dual role of a data object and a processing block. Given a stationary source, the expectation is that ST eventually converges. In operation, the process of FIG. 4 begins with a random initialization of ST. Let k be the number of clusters to be found; this needs to be hard coded into ST, as does n, the number of clusters in the WMT.

We now consider the simultaneous clustering of the terms as well as the documents; i.e., the system must learn both the WMT and ST. We start with both randomly initialized. The simulated annealing for the columns takes as input the doc-cluster/raw-term co-occurrence matrix (matrix 32, FIG. 3A). Although this entire matrix can not be stored, the system can store n-many columns and all k-many rows of it in a second score table, which we will call ST2.

In order to obtain these columns, only the appropriate n terms need be selected from the input documents. Since the WMT can map some hash numbers to unused bins, the system can simply have a WMT (call it WMT2) map the n terms of interest to n bins and all other terms to an unused bin. The strategy is to vary which n terms are inspected over time.

Thus, the system derives two document vectors from each document: the one derived from WMT corresponds to a document/term-cluster row (as in matrix 33, FIG. 3A), while the one derived from WMT2 (500 in FIG. 5) corresponds to a sub-selection of the entries in one row of the raw data matrix (as in matrix 32, FIG. 3A). In order to attain the distribution of each of these columns over the clusters of ST, they are written into the corresponding rows of ST2, (52 in FIG. 5).

Figure 5:
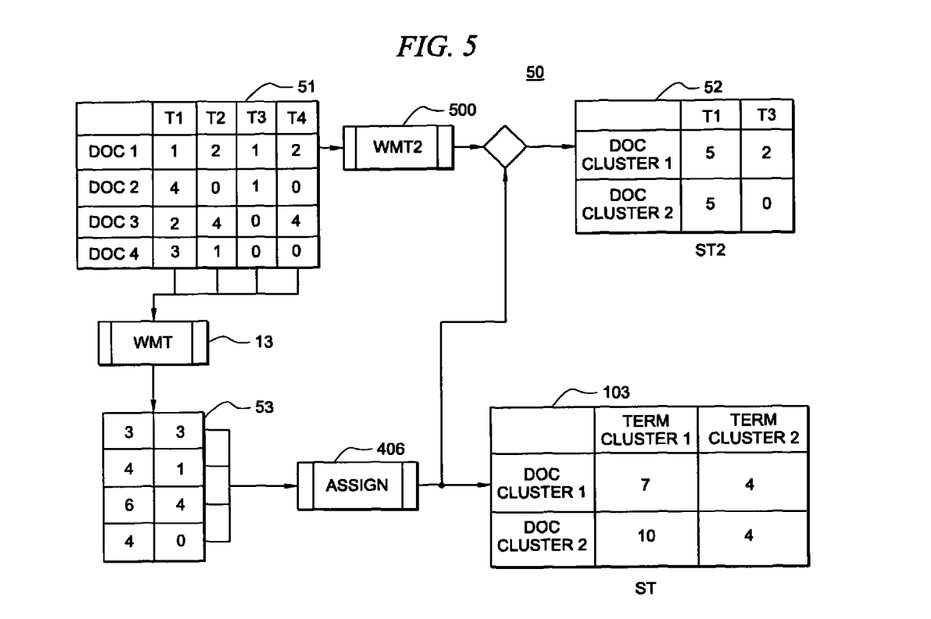
FIG. 5 illustrates one embodiment of a process of populating a score table for use in on-line operation.

FIG. 5 illustrates one embodiment 50 of a process of populating ST 103 (shown also in FIG. 4). A single decision from the assign block determines the row into which both document vectors are placed. Raw matrix 51 is never entirely represented. Single rows of the document/term-cluster matrix 402 are generated by full WMT 402. Some, but not all, single columns of document-cluster/term matrix 52 are generated by WMT2 500, which only selects single terms. A single assignment decision is made which populates ST 404 and ST2 52 consistently.

Figure 6:
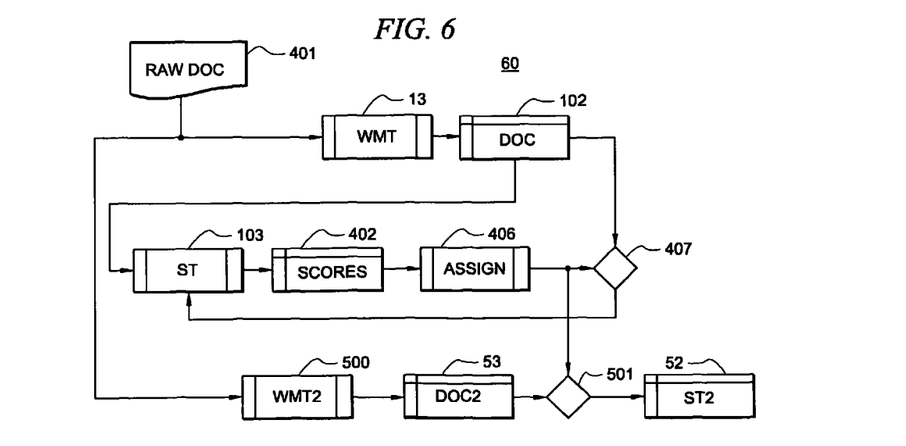
FIG. 6 illustrates one embodiment of an expansion of the embodiment of FIG. 4 to accumulate column statistics while clustering rows.

FIG. 6 illustrates one embodiment 60 of an expansion of embodiment 40, FIG. 4, which accumulates column statistics while clustering rows and can be used, for example, in learner/classifier 202. Embodiment 60 shows the data flow for accumulating ST 103 (cluster/cluster matrix 52) and ST2 52 (document-cluster/term matrix). Doc2 53 and WMT2 500 are shown with their output being combined with the output of assign 406 by diamond 501 to form ST2 52.

System 20, shown in FIG. 2, runs for a period of time. The time of running could be determined based on any number of stopping rules, such as: the number of documents seen, the amount of mass accumulated in ST2, relative increase in the objective function, etc. After this time has passed, ST and ST2 are transposed thereby obtaining ST' and ST2', respectively. ST' is a score table and can be used to compute the change in objective function when moving a term from one row to another. This computation is carried out for each of the n-many terms for which there are accumulated statistics. This then updates ST' in exactly the same way that ST was updated by embodiment 40, FIG. 4. This time, however, the new assignment is recorded in the WMT. Once each row in ST2' has been evaluated and ST' is updated accordingly, ST' can be transposed again to obtain the updated version of ST. WMT2 is then reset to track a new set of terms while clustering documents as before using the new version of ST.

In the system shown in FIG. 6, if the system does not report the vector to the PC, then the ability to update clusters is lost, but the data transmitted per document is decreased thereby increasing the potential receive speed of the system. If the system reports the raw words to the PC, then it has the ability to update the WMT in the same way that it now updates the ST. This significantly increases the amount of data sent to the PC, slowing down the potential operating speed of the system.

Note, those skilled in the art will appreciate that there are many ways to receive and convert the incoming raw data stream. Depending on the type of semantics the system is to discover. If we are interested in ASCII text, we might tokenize based on non-alphabetic characters. If we are interested in structured data fields, such as transactions, we might tokenize based on knowing the number of bytes in each field. If we want to find byte patterns with no prior knowledge, we might look at fixed length sliding windows to produce tokens. In most cases, we are likely to need some sort of hash to convert tokens into a limited number (such as a few million) of raw words.

FIGS. 8A through 8E show embodiments of flow chart 80 performing the concepts of the invention. Process 81 receives the stream of bytes and converts those bytes to a stream of raw words. Process 82, which will be detailed with respect to FIG. 8B, processes the documents with the existing WMT. Process 83, which will be detailed with respect to FIG. 8C, prepares to learn the WMT. Process 84, which will be detailed with respect to FIG. 8D, learns the WMT and process 85, which will be detailed with respect to FIG. 8E, updates the WMT and the score table.

Figure 8A:
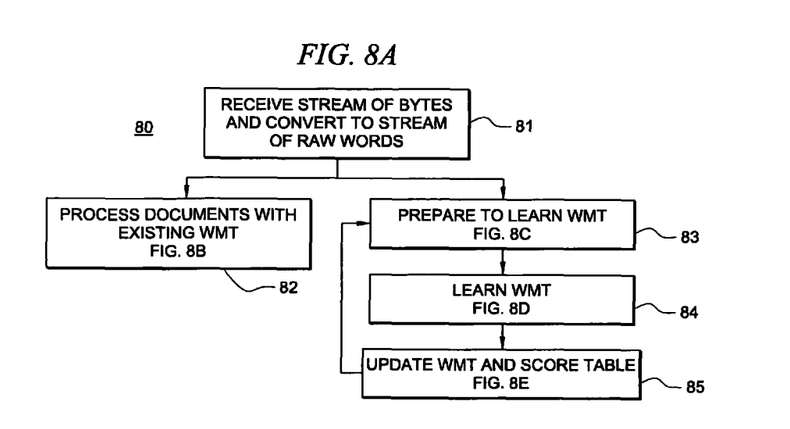
FIGS. 8A through 8E show embodiments of a flow chart for performing the concepts of the invention.
Figure 8B:
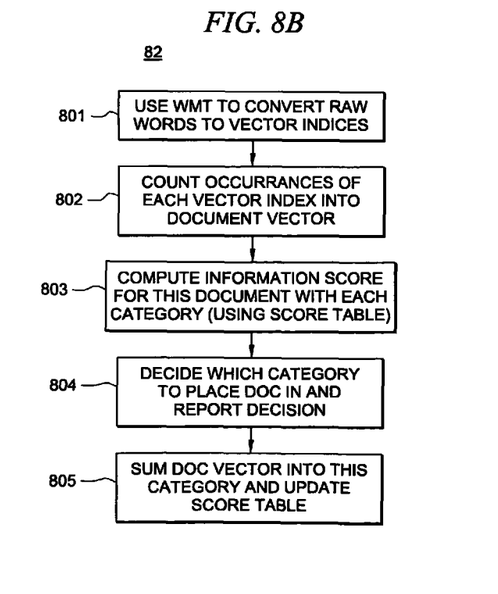

Turning now to FIG. 8B, process 82 processes documents with the existing WMT. In process 801 the WMT is used to convert raw words to vector indices. Process 802 counts the occurrences of each vector index into a document vector. Process 803 computes the information score for this document with each category using the score table. Process 804 decides which category to place the document in and reports the decision. Process 805 sums the document vectors in this category and updates the score table.

Figure 8C:
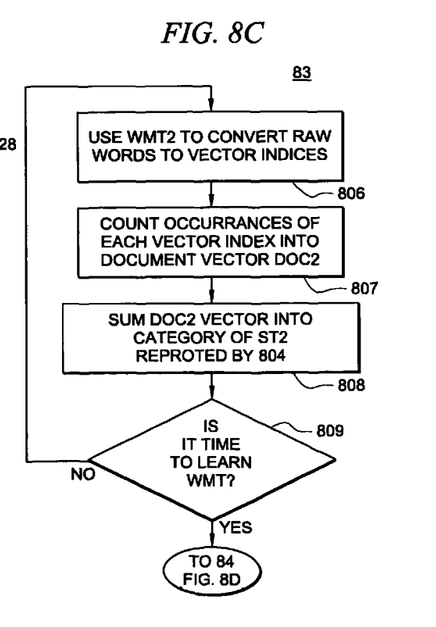

FIG. 8C shows flow chart 83 one embodiment of how the WMT prepares to learn. Process 806 uses the WMT2 to convert raw words into vector indices. Process 807 counts occurrences of each vector index into document vector DOC2. Process 808 sums DOC2 vector into a category of ST2, as reported by process 804, FIG. 8B. Process 809 determines if it is time to learn WMT; if not, the system continues with processing at process 806. If yes, then the system returns to process 84.

Figure 8D:
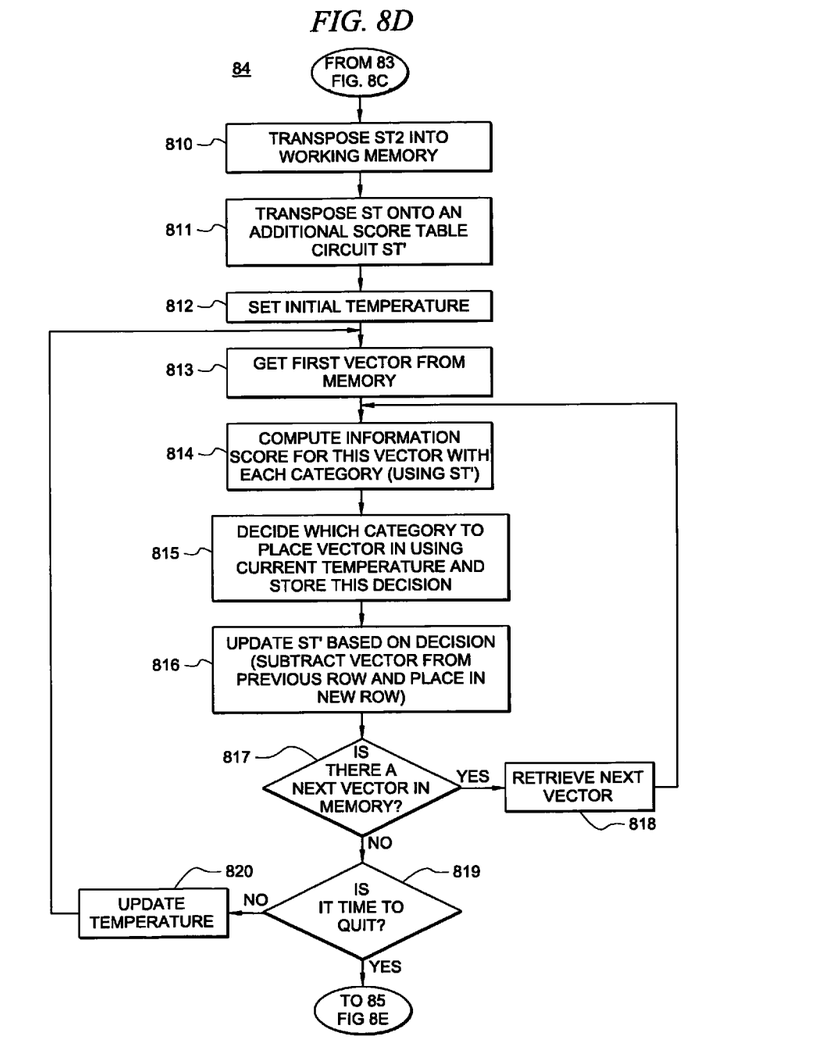

FIG. 8D shows flow chart 84 for learning the WMT. Process 810 transposes ST2 into working memory. Process 811 transposes ST into additional score table circuit ST'. Process 812 sets the initial temperature. Process 813 obtains the first vector from memory from process 810. Process 814 computes the information score for this vector with each category using the ST'. Process 85 decides which category to place the vector in using the current temperature. This decision is stored in memory. Process 816 updates ST' based on the decision which could be by subtracting the vector from the previous row and placing in a new row of the matrix. Process 817 determines if there is a next vector in memory. If yes, then process 818 retrieves the next vector and goes to process 814. If not, a determination is made whether to quit. If yes, the system goes to process 85, FIG. 8E. If not, temperature is updated by process 820 and the process continues at process 813.

Figure 8E:
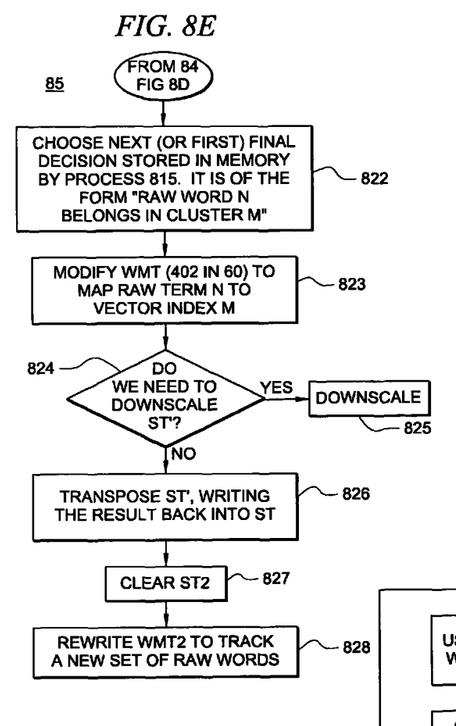

FIG. 8E shows flow chart 85 for updating the WMT and ST. Process 822 chooses the next or first final decision stored in memory by step 815 of FIG. 8D and is in the form "raw word N belongs in cluster M". Process 823 modifies the WMT to map raw term N to vector index M. Process 824 determines whether it is time to downscale ST'. If not, the system continues at process 826. If yes, then the system downscales. Process 826 transposes ST', writing the result back into ST. Process 827 clears ST2 and process 828 rewrites WMT2 to track a new set of raw words.

Note that process 824 could simply report yes each time and use a constant multiplier, if desired. A more elaborate algorithm might consider the number of values in ST' that are close to saturation, i.e., the maximum value that can be stored and deal with those numbers.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for determining the semantics of a data stream, said determining performed by a computer, comprising:
    determining in real-time clusters of similar data flows in a data stream; determining simultaneously in real-time a word mapping table (WMT) defining clusters of data objects used similarly by said clustered data flows by simultaneously finding a partition with respect to said similarly used clustered data objects and a partition with respect to said similar data stream;
    wherein said simultaneous partition defines a cluster of similar data flows as containing similarly used data objects and defines similarly used data objects as occurring in similar data flows;
    using a score table to compute a change in mutual information resulting from adding a set of input data to a particular cluster;
    adding the set of input data to the particular cluster based on the change in mutual information;
    updating the score table in response to adding the set of input data to the particular cluster; wherein adding the set of input data to the particular cluster comprises:
    assigning the input data to a best cluster with probability AA and assigning said data to a second best cluster with the probability of BB, where AA and BB are determined by the mutual information that would result from insertion into the best or second best clusters, respectively, and
    determining the semantics of said data stream using said computed WMT and said flow clusters.

2. The method of claim 1 wherein said computing comprises:
    generating a co-clustered co-occurrence matrix based on repetition of identified words and patterns of words in said data stream.

3. The method of claim 2 further comprising:
    continually updating said WMT based on newly arrived data.

4. The method of claim 3 further comprising:
    downscaling any stored cluster matrix from time to time by reducing data in said WMT.

5. The method of claim 2 wherein column statistics of said matrix is accumulated as data flows arrive and column operations are delayed until a pre-determined condition is satisfied.

6. The method of claim 5 wherein said pre-determined condition comprises the number of received data flows.

7. The method of claim 2 wherein said co-clustering comprises simultaneous clustering of rows and columns of said matrix.

8. The method of claim 7 wherein said simultaneous clustering of rows and columns comprises at least one transposing operation such that columns of said co-clustered matrix become rows of a transposed matrix.

9. A system for organizing data streams into clusters, said system comprising:
    means for receiving a data stream;
    means for converting each document to a vector;
    means for placing each document in at least one proper document cluster having a particular profile, based, at least in part, on an agreement between the document vector and an existing cluster profile, wherein the agreement is assessed based on a change in mutual information resulting from placing the document in the at least one proper document cluster,
    wherein placing each document in at least one proper document cluster comprising: assigning each document to a best cluster with probability AA and assigning said document to a second best cluster with the probability of BB, where AA and BB are determined by the mutual information that would result from insertion into the best or second best clusters, respectively,
    wherein said cluster profile is continually updated in real-time with information from newly arrived documents in said data stream to reflect existing documents in said at least one cluster and newly arrived documents; said clusters developed in real-time as said documents are being received such that the number of clusters is based, at least, on documents in the data stream.

10. The system of claim 9 further comprising:
    means for downscaling said clusters wherein said downscaling comprises multiplying said cluster profile by a fraction to reduce the amount of data in use by said cluster profile.

11. The system of claim 9 wherein said placing means comprises:
    means for hashing raw terms of said document; and
    wherein said document clusters are derived from said vectors.

12. The system of claim 11 further comprising:
    a score table for storing said document clusters.

13. The system of claim 9 further comprising:
    means for re-analyzing data from said data stream on a continual basis.

14. The system of claim 9 wherein said placing means comprises:
    means for generating a co-clustered, co-occurrence matrix containing documents and document terms obtained from said data stream.

15. A method for separating data streams into clusters, said separating performed by a computer, said method comprising:
- assembling real-time data from a received data stream into a document representation; converting each document representation to a vector; computing an inner product for each said document vector; determining scores for each computed inner value of said document vector; storing said computed inner products and said determined scores by a score table;
- developing real-time document clusters of similar data received from said data stream in real-time, wherein said developing is based at least in part on said score table;
- placing in real-time each document in a proper document cluster based on a change in mutual information resulting from adding the document to the proper document cluster;
- wherein placing in real time each document in at least one proper document cluster comprising:
- assigning each document to a best cluster with probability AA and assigning said document to a second best cluster with the probability of BB, where AA and BB are determined by the mutual information that would result from insertion into the best or second best clusters, respectively;
- updating said score table in response to placing each document into its respective proper cluster; and
- determining whether to downscale said clusters, wherein said downscale determination comprises comparing the determined scores in said score table to a pre-defined condition to reduce data in use by said score table.

16. The method of claim 15 wherein downscaling comprises: multiplying said clusters by a constant fraction.

17. The method of claim 15 further comprises downscaling said clusters if it is determined that the pre-defined condition is satisfied.

18. The method of claim 15 wherein said developing comprises:
- hashing the raw terms of said document; and
- deriving said document clusters from said hashed raw terms.

19. The method of claim 18 further comprises mapping of a portion of said hashed raw terms to one or more unused bins wherein said portion of hashed raw terms changes over time.

20. The method of claim 15 further comprising:
- storing said document clusters in a word mapping table.

21. The method of claim 15 further comprising:
- re-analyzing data from said data stream from time to time.

22. The method of claim 15 wherein said developing comprises:
- generating a co-clustered, co-occurrence matrix containing document terms obtained from said data stream.

23. The method of claim 15,
- wherein document cluster assignment information and document vector information are used to update said score table in real-time.

* * * * *

UNITED STATES PATENT AND TRADEMARK OFFICE
CERTIFICATE OF CORRECTION

| | | |
|---|---|---|
| PATENT NO. | : 8,788,701 B1 | Page 1 of 1 |
| APPLICATION NO. | : 11/509930 | |
| DATED | : July 22, 2014 | |
| INVENTOR(S) | : John Byrnes et al. | |

It is certified that error appears in the above-identified patent and that said Letters Patent is hereby corrected as shown below:

In the Specification

At column 6, line number 17, delete "sop" and replace with --so $p$--.
At column 6, line number 54, delete "off" and replace with --of $f$--.

Signed and Sealed this
Fourteenth Day of October, 2014

Michelle K. Lee
*Deputy Director of the United States Patent and Trademark Office*

UNITED STATES PATENT AND TRADEMARK OFFICE
CERTIFICATE OF CORRECTION

| | | |
|---|---|---|
| PATENT NO. | : 8,788,701 B1 | Page 1 of 1 |
| APPLICATION NO. | : 11/509930 | |
| DATED | : July 22, 2014 | |
| INVENTOR(S) | : Byrnes et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1189 days.

Signed and Sealed this
Thirteenth Day of October, 2015

Michelle K. Lee
*Director of the United States Patent and Trademark Office*